(12) United States Patent
Eckel et al.

(10) Patent No.: US 6,753,366 B1
(45) Date of Patent: Jun. 22, 2004

(54) FLAME RESISTANT ABS POLYCARBONATE MOULDABLE MATERIALS

(75) Inventors: Thomas Eckel, Dormagen (DE); Dieter Wittmann, Leverkusen (DE); Herbert Eichenauer, Dormagen (DE); Heinrich Alberts, Odenthal (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/485,288

(22) PCT Filed: Jul. 29, 1998

(86) PCT No.: PCT/EP98/04735
§ 371 (c)(1),
(2), (4) Date: Feb. 7, 2000

(87) PCT Pub. No.: WO99/07780
PCT Pub. Date: Feb. 18, 1999

(30) Foreign Application Priority Data
Aug. 11, 1997 (DE) .......................... 197 34 659

(51) Int. Cl.⁷ .............................. C08K 5/523
(52) U.S. Cl. ...................... 524/127; 524/145
(58) Field of Search ................... 523/127; 524/145, 524/127, 423

(56) References Cited

U.S. PATENT DOCUMENTS

| | | | |
|---|---|---|---|
| 1,341 A | * 9/1839 | Hughes et al. | 37/435 |
| 4,172,103 A | * 10/1979 | Serini et al. | 525/76 |
| 5,205,394 A | 4/1993 | Zeuschner | 198/369 |
| 5,397,533 A | * 3/1995 | Morikawa et al. | 420/418 |
| 5,455,292 A | * 10/1995 | Kakegawa et al. | 524/127 |
| 5,658,974 A | * 8/1997 | Fuhr et al. | 524/127 |
| 5,672,645 A | * 9/1997 | Eckel et al. | 524/127 |
| 5,674,924 A | * 10/1997 | Lee et al. | 524/127 |
| 5,679,759 A | 10/1997 | Wittmann et al. | 528/196 |
| 5,741,838 A | * 4/1998 | Fuhr et al. | 524/127 |
| 5,849,827 A | * 12/1998 | Bödiger et al. | 524/423 |
| 5,900,446 A | * 5/1999 | Nishihara et al. | 524/127 |
| 5,969,016 A | * 10/1999 | Weber | 524/127 |
| 5,994,480 A | * 11/1999 | Wang et al. | 525/523 |
| 6,013,700 A | * 1/2000 | Asano et al. | 523/335 |
| 6,066,686 A | * 5/2000 | Katayama et al. | 524/127 |

FOREIGN PATENT DOCUMENTS

JP 07011119 * 1/1995 ............... 524/127

* cited by examiner

*Primary Examiner*—Peter Szekely
(74) *Attorney, Agent, or Firm*—Joseph C. Gil; Aron Preis

(57) ABSTRACT

A thermoplastic, flame-retardant moulding composition having improved mechanical properties is disclosed. The composition contains 40 to 99 parts by weight of a thermoplastic polycarbonate or polyester carbonate, 0.5 to 60 parts by weight of a graft polymer, 0 to 45 parts by weight of a thermoplastic vinyl copolymer, 0.5 to 20 parts by weight of a mixture of at least one mono- and at least one oligophosphorus conforming to the general formula

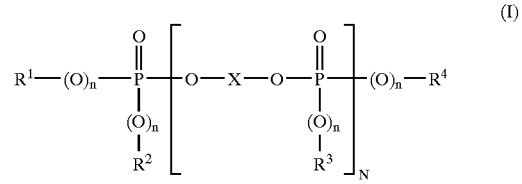

(I)

and 0.05 to 5 parts by weight of a fluorinated polyolefine.

14 Claims, No Drawings

FLAME RESISTANT ABS POLYCARBONATE MOULDABLE MATERIALS

The present invention relates to polycarbonate-ABS moulding compositions which are made flame-retardant with phosphorus compounds, and which exhibit an excellent level of mechanical properties, particularly a considerably improved ultimate tensile strength and yield stress as well as an outstanding tensile modulus of elasticity.

EP-A-0 363 608 describes polymer mixtures comprising an aromatic polycarbonate and a copolymer or graft copolymer containing styrene, as well as oligomeric phosphates as flame retardant additives. The level of mechanical properties of these mixtures is often unsatisfactory for certain purposes of use.

EP-A-0 704 488 describes moulding compositions comprising an aromatic polycarbonate, copolymers which contain styrene, and graft polymers with a special graft base, in defined quantitative ratios. These moulding compositions have a very good notched bar impact strength, and can optionally be made flame-retardant with phosphorus compounds. Their level of mechanical properties is not always satisfactory for the production of mouldings which are subject to intensified elastic loading.

The object of the present invention is therefore to provide flame-retardant polycarbonate-ABS moulding compositions which, in addition to the requisite high level of flame-retardancy, have an excellent ultimate tensile strength and an excellent tensile modulus of elasticity.

It has now been found that PC/ABS moulding compositions, which contain phosphorus compounds according to component D (see below) and a graft polymer comprising a graft base of defined particle size, can be processed to form mouldings with a very good level of mechanical properties, particularly under intensified elastic loading also.

The present invention therefore relates to a flame-retardant thermoplastic moulding composition containing A. 40 to 99, preferably 60 to 98.5 parts by weight, of an aromatic polycarbonate or polyester carbonate B. 0.5 to 60, preferably 1 to 40, particularly 2 to 25 parts by weight, of a graft polymer of B.1 5 to 95, preferably 30 to 80% by weight, of one or more vinyl monomers on B.2 95 to 5, preferably 20 to 70% by weight of one or more graft bases with a glass transition temperature <0° C., preferably <−20° C., and an average particle size ($d_{50}$ value) of 0.20 to 0.35 μm, preferably 0.25 to 0.30 μm C. 0 to 45, preferably 0 to 30, most preferably 2 to 25 parts by weight of a thermoplastic vinyl (co)polymer D. 0.5 to 20 parts by weight, preferably 1 to 18 parts by weight, most preferably 2 to 15 parts by weight, of at least one mono- and at least one oligophosphorus compound of general formula (I)

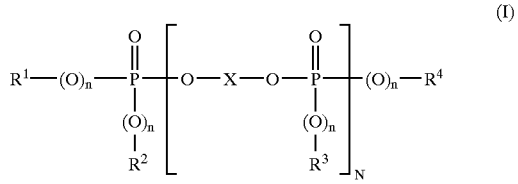

(I)

wherein $R^1$, $R^2$, $R^3$ and $R^4$, independently of each other, each denote a $C_1$ to $C_8$ alkyl which is optionally halogenated in each case, a $C_5$ to $C_6$ cycloalkyl, $C_6$ to $C_{20}$ aryl or $C_7$ to $C_{20}$ aralkyl, which are each optionally substituted by an alkyl, preferably a $C_1$–$C_4$ alkyl and/or by a halogen, preferably chlorine or bromine, n denotes 0 or 1, which are independent of each other.

N denotes 0 to 30, and

X denotes a mono- or polynuclear aromatic radical containing 6 to 30 C atoms; and E. denotes 0.05 to 5 parts by weight, preferably 0.1 to 1 parts by weight, most preferably 0.1 to 0.5 parts by weight, of a fluorinated polyolefine, wherein the sum of all the parts by weight of A+B+C+D+E is 100.

Moulding compositions which are particularly preferred are those in which the ratio by weight of components B:C is between 2:1 and 1:4, preferably between 1:1 and 1:3.

In the moulding compositions according to the invention, component D is preferably present as a mixture of 10 to 90% by weight, preferably 12 to 40% by weight, of at least one monophosphorus compound of formula (I), and 10 to 90% by weight, preferably 60 to 88% by weight, with respect to the total amount of phosphorus compounds in each case, of at least one oligophosphorus compound of formula (I), wherein the mixture has an average N of 0.3 to 20, preferably 0.5 to 10, most preferably 0.5 to 6.

COMPONENT A

Aromatic polycarbonates and/or aromatic polyester carbonates according to component A which are suitable according to the invention are known from the literature or can be produced by methods known from the literature (for example, for the production of aromatic polycarbonates, see Schnell, "Chemistry and Physics of Polycarbonates", Interscience Publishers, 1964, as well as DE-AS 1 495 626, DE-OS 2 232 877, DE-OS 2 703 376, DE-OS 2 714 544, DE-OS 3 000 610 and DE-OS 3 832 396; for the production of aromatic polyester carbonates see DE-OS 3 077 934 for example).

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators e.g. monophenols, and optionally with the use of trifunctional branching agents or branching agents with a functionality higher than three, for example triphenols or tetraphenols.

Diphenols for the production of the aromatic polycarbonates and/or aromatic polyester carbonates are preferably those of formula (II)

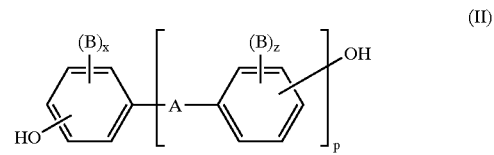

(II)

wherein

A denotes a single bond, a $C_1$–$C_5$ alkylene, a $C_2$–$C_5$ alkylidene, a $C_5$–$C_6$ cycloalkylidene, —O—, —SO—, —CO—, —S—, —SO$_2$—, or a $C_6$–$C_{12}$ arylene, on to which other aromatic rings, which optionally contain hetero atoms, can be condensed, or a radical of formula (III) or (IV)

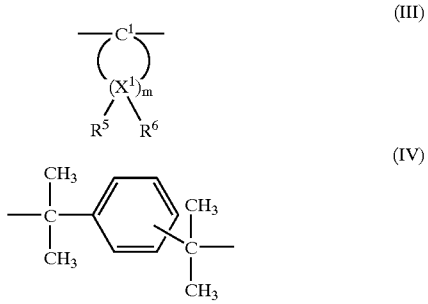

B denotes hydrogen a $C_1$–$C_{12}$ alkyl, preferably methyl, or a halogen, preferably chlorine and/or bromine, in each case x is 0.1 or 2, independently of each other, in each case.

p is 1 or 0, and $R^5$ and $R^6$, which are independent of each other and are individually selectable for each $X^1$, denote hydrogen or a $C_1$–$C_6$ alkyl, preferably hydrogen, methyl or ethyl.

$X^1$ denotes carbon, and m denotes an integer from 4 to 7, preferably 4 or 5, with the proviso that $R^5$ and $R^6$ simultaneously denote an alkyl on at least one $X^1$ atom.

The preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis (hydroxyphenyl)-ethers, bis-(hydroxyphenyl)-sulphoxides, bis-(hydroxyphenyl)ketones, bis-(hydroxyphenyl)-sulphones and α,α'-bis-(hydroxyphenyl)-diisopropylbenzenes, as well as derivatives thereof which have brominated and/or chlorinated nuclei.

Diphenols which are particularly preferred are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-4-hydroxyphenyl)-3,3,5-trimethylcyclohexane, 4,4,-dihydroxydiphenyl sulphide and 4,4,-dihydroxydiphenyl-sulphone, as well as di- and tetrabrominated or chlorinated derivatives thereof, such as 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol A) is particularly preferred.

The diphenols can be used individually or as arbitrary mixtures.

The diphenols are known from the literature or can be obtained by methods known from the literature.

Examples of suitable chain terminators for the production of the thermoplastic, aromatic polycarbonates include phenol, p-chlorophenol, p-tert.-butylphenol or 2,4,6-tribromophenol, as well as long chain alkylphenols such as 4-(1,3-tetramethyl-butyl)-phenol according to DE-OS 2 842 005 or monoalkylphenols or dialkylphenols which contain a total of 8 to 20 C atoms in their alkyl substituents, such as 3,5-di-tert.-butyl-phenol, p-iso-octylphenol, p-tert.-octylphenol, p-dodecylphenol, 2-(3,5-dimethylheptyl)-phenol and 4-(3,5-dimethylheptyl)-phenol. The amount of chain terminators used is generally between 0.5 mole % and 10 mole % with respect to the molar sum of the diphenols used in each case.

The thermoplastic, aromatic polycarbonates have mean weight average molecular weights ($M_w$, as measured by ultracentrifuging or by scattered light measurements) of 10,000 to 200,000, preferably 20,000 to 80,000.

The thermoplastic, aromatic polycarbonates can be branched in the known manner, in fact by the incorporation of 0.05 to 2.0 mole %, with respect to the sum of the diphenols used, of trifunctional compounds or of compounds with a functionality higher than three, for example those which contain three or more phenolic groups.

Both homopolycarbonates and copolycarbonates are suitable. For the production of copolycarbonates according to component A) in accordance with the invention, 1 to 25% by weight, preferably 2.5 to 25% by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature. For example, the production of copolycarbonates which contain polydiorganosiloxanes is described in DE-OS 3 334 782.

Apart from bisphenol A homopolycarbonates, the preferred polycarbonates are the copolycarbonates of bisphenol A with up to 15 mole %, with respect to the molar sums of the diphenols, of other diphenols which are cited as preferred or particularly preferred, in particular 2,2-bis(3,5-dibromo-4-hydroxyphenyl)-propane.

The preferred aromatic dicarboxylic acid dihalides for the production of the aromatic polyester carbonates are the diacid dichlorides of isophthalic acid, terephthalic acid, diphenyl ether-4,4'-dicarboxylic acid and naphthalene-2,6-dicarboxylic acid.

Mixtures of the diacid dichlorides of isophthalic acid and terephthalic in a ratio between 1:20 and 20:1 are particularly preferred.

A carbonic acid halide, preferably phosgene, is used in conjunction as a difunctional acid derivative during the production of the polyester carbonates.

Apart from the aforementioned monophenols, suitable chain terminators for the production of the aromatic polyester carbonates include chlorocarboxylic acid esters thereof, as well as the acid chlorides of aromatic monocarboxylic acids which may optionally be substituted by $C_1$–$C_{22}$ alkyl groups, or by halogen atoms, and also include aliphatic $C_2$–$C_{22}$ monocarboxylic acid chlorides.

The amount of chain terminator is 0.1 to 10 mole % in each case, with respect to the moles of diphenols in the case of phenolic chain terminators and with respect to the moles of dicarboxylic acid dichlorides in the case of monocarboxylic acid chloride chain terminators.

The aromatic polyester carbonates may also contain incorporated hydroxycarboxylic acids.

The aromatic polyester carbonates may be either linear or may be branched in the known manner (see DE-OS 2 940 024 and DE-OS 3 007 934 in this respect also).

Tri- or multi-functional carboxylic acid chlorides can be used as branching agents, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of 0.01 to 1.0 mole % (with respect to the dicarboxylic acid dichlorides used) or tri- or multi-functional phenols such as phloroglucinol, 4,6-dimethyl-2,4,6,-tri-(4-hydroxyphenyl)-heptene-2, 4,4-dimethyl-2,4,6-tri-(4-hydroxyphenyl)-heptane, 1,3,5-tri-(4-hydroxy-phenyl)-benzene, 1,1,1-tri-(4-hydroxy-phenyl)-ethane, tri-(4-hydroxyphenyl)-phenyl-methane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)4-methyl-phenol, 2-(4-hydroxyphenyl)-2-(2,4- dihydroxyphenyl)-propane, tetra-(4-[4-hydroxyphenyl-isopropyl]-phenoxy)-methane or 1,4-bis[4,4'-dihydroxytriphenyl)-methyl]benzene, in amounts of 0.01 to 1.0 mole % with respect to the diphenols used. Phenolic branching agents can be placed in the reaction vessel with the diphenols. Acid chloride branching agents can be introduced together with the acid chlorides.

The proportion of carbonate structural units in the thermoplastic, aromatic polyester carbonates can be arbitrarily varied. The content of carbonate groups is preferably up to 100 mole %, particularly up to 80 mole %, most preferably up to 50 mole %, with respect to the sum of ester groups and carbonate groups. Both the ester and the carbonate fraction of the aromatic polyester carbonates can be present in the form of blocks, or can be randomly distributed in the condensation polymer.

The relative solution viscosity ($\eta_{rel}$)of the aromatic polyester carbonates falls within the range of 1.18 to 1.4, preferably 1.22 to 1.3 (as measured on solutions of 0.5 g polyester carbonate in 100 ml methylene chloride at 25° C.).

The thermoplastic, aromatic polycarbonates and polyester carbonates can be used on their own or in any mixture with each other.

COMPONENT B

Component B comprises one or more graft copolymers of

B.1 5 to 95, preferably 30 to 80% by weight, of one or more vinyl monomers on

B.2 95 to 5, preferably 70 to 20% by weight of one or more graft bases with a glass transition temperature<0° C. preferably <−20° C. and an average particle size ($d_{50}$ value) of 0.20 to 0.35 µm.

Monomers B.1 are preferably mixtures of

B1.1 50 to 99 parts by weight of aromatic vinyl compounds and/or aromatic vinyl compounds with substituted nuclei (such as styrene, α-methylstyrene, p-methylstyrene or p-chlorostyrene for example) and/or $C_1$–$C_4$ alkyl esters of (meth)acrylic acid (such as methyl methacrylate or ethyl methacrylate for example), and B1.2 1 to 50 parts by weight vinyl cyanides (unsaturated nitriles, such as acrylonitrile and methacrylonitrile for example) and/or $C_1$–$C_4$ alkyl esters of (meth)acrylic acid (such as methyl methacrylate, n-butyl acrylate and t-butyl acrylate for example) and/or derivatives (such as anhydrides and imides) of unsaturated carboxylic acids (for example maleic anhydride and N-phenylmaleinimide).

The preferred monomers B.1.1 are selected from at least one of the monomers styrene, α-methylstyrene and methyl methacrylate. The preferred monomers B.1.2 are selected from at least one of the monomers acrylonitrile, maleic anhydride and methyl methacrylate.

The monomers which are particularly preferred are styrene as B.1.1 and acrylonitrile as B.1.2.

Examples of suitable graft bases B.2 for graft polymers B. include diene rubbers, EP(D)M rubbers, namely those based on ethylene/propylene- and optionally diene, acrylate, polyurethane, silicone, chloroprene and ethylene/vinyl acetate rubbers.

The preferred graft bases B.2 are diene rubbers (e.g. those based on butadiene, isoprene etc.) or mixtures of diene rubbers or copolymers of diene rubbers or mixtures thereof with other copolymerisable monomers (e.g. according to B.1.1 and B.1.2), with the proviso that the glass transition temperature of component B.2 is less than 0° C.

Pure polybutadiene rubber is particularly preferred.

Examples of particularly preferred polymers B. include ABS polymers (emulsion, bulk and suspension ABS), such as those which are described, for example, in DE-OS 2 035 390 (=US-PS 3 644 574) or in DE-OS 2 248 242 (=GB-PS 1 409 275) or in Ullmann. Enzyklopädie der Technischen Chemie, Volume 19 (1980), page 280 et seq. The gel content of graft base B.2 is at least 30% by weight, preferably at least 40% by weight (as measured in toluene), and the average particle diameter of graft base B.2 is 0.20 to 0.35 µm, preferably 0.25 to 0.30 µm.

Graft copolymers B. are produced by radical polymerisation, e.g. by emulsion, suspension, solution or bulk polymerisation, preferably by emulsion polymerisation.

ABS polymers, which are produced by redox initiation with an initiator system comprising an organic hydroperoxide and ascorbic acid according to U.S. Pat. No. 4,937,285, are particularly suitable graft rubbers.

Suitable acrylate rubbers according to B.2 of polymer B are preferably polymers of acrylic acid alkyl esters, optionally with up to 40% by weight, with respect to B.2, of other polymerisable, ethylenically unsaturated monomers. The preferred polymerisable acrylic acid esters include $C_1$–$C_8$ alkyl esters, for example methyl, ethyl, butyl, n-octyl and 2-ethylhexyl esters: halogenoalkyl esters, preferably halogeno-$C_1$–$C_8$-alkyl esters such as chloroethyl acrylate, as well as mixtures of these monomers.

Monomers with more than one polymerisable double bond can be copolymerised to provide crosslinking. The preferred examples of crosslinking monomers are the esters of unsaturated monocarboxylic acids containing 3 to 8 C atoms and unsaturated monohydric alcohols containing 3 to 12 C atoms, or saturated polyols containing 2 to 4 OH groups and 2 to 20 C atoms, such as ethylene glycol dimethacrylate or allyl methacrylate for example; multiply-unsaturated heterocyclic compounds, such as trivinyl and triallyl cyanurate for example; polyfunctional vinyl compounds such as di- and trivinylbenzenes; and also triallyl phosphate and diallyl phthalate.

The preferred crosslinking monomers are allyl methacrylate, ethylene glycol dimethacrylate, diallyl phthalate and heterocyclic compounds which contain at least 3 ethylenically unsaturated groups.

Crosslinking monomers which are particularly preferred are the cyclic monomers triallyl cyanurate, triallyl isocyanurate, triacryloyl hexahydro-s-triazine and triallylbenzenes. The amount of crosslinked monomer is preferably 0.02 to 5, particularly 0.05 to 2% by weight, with respect to graft base B.2.

For cyclic crosslinking monomers containing at least 3 ethylenically unsaturated groups, it is advantageous to restrict the amount thereof to less than 1% by weight of graft base B.2.

Examples of preferred "other" polymerisable, ethylenically unsaturated monomers which can optionally be employed apart from acrylic acid esters for the production of graft base B.2 include acrylonitrile, styrene, α-methylstyrene, acrylamides, vinyl-$C_1$–$C_6$-alkyl ethers, methyl methacrylate and butadiene. The acrylate rubbers which are preferred as graft base B.2 are emulsion polymers which have a gel content of at least 60% by weight.

Other graft bases which are suitable according to B.2 are silicone rubbers with graft-active sites, such as those described in DE-OS 3 704 657, DE-OS 3 704 655, DE-OS 3 631 540 and DE-OS 3 631 539.

The gel content of graft base B.2 is determined at 25° C. in a suitable solvent (M. Hoffmann. H. Krömer. R. Kuhn, Polymeranalytik I and II, Georg Thieme-Verlag, Stuttgart 1977).

The average particle size $d_{50}$ is the diameter above and below which 50% of the particles lie in each case. It can be determined by means of ultracentrifuge measurements (W Scholtan, H. Lange, Kolloide, Z. and Z. Polymere 250 (1972), 782-1796).

Since, as is known, the graft monomers are not actually grafted completely on to the graft base during the grafting reaction, graft polymers B. are also to be understood according to the invention to include those products which are obtained by (co)polymerisation of the graft monomers in the presence of the graft base and which occur in conjunction during processing.

COMPONENT C

Component C comprises one or more thermoplastic vinyl (co)polymers.

Polymers which are suitable as component C. are polymers of at least one monomer from the group comprising aromatic vinyl compounds, vinyl cyanides (unsaturated nitriles), (meth)acrylic acid ($C_1$–$C_8$)-alkyl esters, unsaturated carboxylic acids, as well as derivatives (such as anhydrides and imides) of unsaturated carboxylic acids. (Co)polymers which are particularly suitable are those of C.1 50 to 99, preferably 60 to 80 parts by weight of aromatic vinyl compounds and/or aromatic vinyl compounds which comprise substituted nuclei, such as styrene, α-methylstyrene, p-methylstyrene, p-chlorostyrene) and/or methacrylic acid ($C_1$–$C_4$)-alkyl esters, such as methyl methacrylate or ethyl methacrylate for example), and C.2 1 to 50, preferably 20 to 40 parts by weight vinyl cyanides (unsaturated nitrites) such as acrylonitrile and methacrylonitrile and/or (meth)acrylic acid ($C_1$–$C_8$) esters (such as methyl methacrylate, n-butyl acrylate or t-butyl acry late for example) and/or unsaturated carboxylic acids (such as maleic acid) and/or derivatives (such as anhydrides and imides) of unsaturated carboxylic acids (for example maleic anhydride and N-phenyl-maleinimide).

(Co)polymers C are resin-like, thermoplastic and free from rubber.

The copolymer of C.1 styrene and C.2 acrylonitrile is particularly preferred.

The (co)polymers according to C are known, and can be produced by radical polymerisation, particularly by emulsion, suspension, solution or bulk polymerisation. The (co)polymers according to component C preferably have molecular weights $M_w$ (weight average, determined by light scattering or sedimentation) between 15,000 and 200,000.

(Co)polymers according to component C are frequently produced as by-products during the graft polymerisation of component B, particularly when large amounts of monomers B.1 are grafted on to small amounts of rubber B.2. The amount of C which can also optionally be used according to the invention does not include these by-products of the graft polymerisation of B.

However, component C should be present in the moulding compositions according to the invention for certain purposes of use.

If component C is present in the moulding compositions, the ratio by weight of components B:C should be between 2:1 and 1:4, preferably between 1:1 and 1:2, in order to obtain the desired level of mechanical properties for certain purposes of use.

COMPONENT D

Component D is a mixture of at least one mono- and of at least one oligomeric phosphorus compound of formula (I).

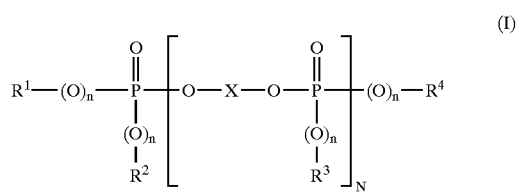

In this formula, $R^1$, $R^2$, $R^3$ and $R^4$ have the meanings given above, $R^1$, $R^2$, $R^3$ and $R^4$ preferably denote, independently of each other, $C_1$–$C_4$ alkyl, phenyl, naphthyl or phenyl-$C_1$–$C_4$-alkyl. The aromatic groups $R^1$, $R^2$, $R^3$ and $R^4$ may themselves be substituted with halogen and/or alkyl groups, preferably chlorine, bromine and/or $C_1$–$C_4$-alkyl. The most preferred aryl radicals are cresyl, phenyl, xylenyl, propylphenyl or butylphenyl, as well as the corresponding brominated and chlorinated derivatives thereof.

X in formula (I) denotes a mono- or polynuclear aromatic radical containing 6 to 30 C atoms. This is derived from diphenols, such as diphenyl-phenol, bisphenol A, resorcinol or hydroquinone for example, or from chlorinated or brominated derivatives thereof.

n in formula (I) can be 0 or 1, independently of each other, n is preferably equal to 1.

N represents values of 0 to 30, and preferably represents an average value of 0.3 to 20, most preferably 0.5 to 10, particularly 0.5 to 6.

Mixtures are used as component D according to the invention which preferably comprise 10 to 90% by weight, most preferably 12 to 40% by weight, of at least one monophosphorus compound of formula (I) and of at least one oligomeric phosphorus compound, or which comprise a mixture of oligomeric phosphorus compounds in amounts of 10 to 90% by weight, preferably 60 to 88% by weight, with respect to the total amount of phosphorus compounds.

Particular monophosphorus compounds of formula (I) are tributyl phosphate, tris-(2-chloroethyl)-phosphate, tris-(2,3-dibromopropyl) phosphate, triphenyl phosphate, tricresyl phosphate, diphenyl cresyl phosphate, diphenyl octyl phosphate, diphenyl-2-ethyl-cresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The mixtures of monomeric and oligomeric phosphorus compounds of formula (I) have average N values of 0.3 to 20, preferably 0.5 to 10, particularly 0.5 to 6.

The phosphorus compounds according to component D are known (see, for example, EP-A 363 608, EP-A 640 655) or can be prepared in an analogous manner by known methods (e.g. Ullmanns Encyklopädie der technischen Chemie, Volume 8, page 301 et seq. 1979; Houben-Weyl, Methoden der organischen Chemie, Volume 12/1 page 43; Beilstein Volume 6, page 177).

COMPONENT E

Fluorinated polyolefines E) are of high molecular weight and have glass transition temperatures above −30° C. generally above 100° C. They preferably have fluorine contents of 65 to 76, particularly 70 to 76% by weight, and average particle diameters $d_{50}$ of 0.05 to 1000, preferably 0.08 to 20 μm. In general, fluorinated polyolefines E) have a density of 1.2 to 2.3 g/cm³. The preferred fluorinated polyolefines E) are polytetrafluoroethylene, polyvinylidene fluoride, and tetrafluoroethylene (hexafluoropropylene) and ethylene/ tetrafluoroethylene copolymers. These fluorinated polyolefines are known (see "Vinyl and Related Polymers" by Schildknecht, John Wiley & Sons, Inc., New York, 1962, pages 484–494; "Fluoropolymers" by Wall, Wiley-Interscience, John Wiley & Sons, Inc., New York, Volume 13, 1970, pages 623–654; "Modern Plastics Encyclopedia", 1970–1971, Volume 47, No.10 A, October 1970. McGraw-Hill, Inc., New York, pages 134 and 774; "Modern Plastics Encyclopedia", 1975–1976. October 1975, Volume 52, No.10 A, McGraw-Hill, Inc., New York, pages 27, 28 and 472; and U.S. Pat. Nos. 3,671,487, 3,723,373 and 3,838, 092).

They can be produced by known methods, for example by the polymerisation of tetrafluoroethylene in aqueous medium with a catalyst which forms free radicals, for example sodium, potassium or ammonium peroxydisulphate, at pressures of 7 to 71 kg/cm$^2$ and at temperatures of 0 to 200° C., preferably at temperatures of 20 to 100° C. (for further details, for example, see U.S. Pat. No. 2,393,967). Depending on the form in which they are used, the density of these materials may be between 1.2 and 2.3 g/cm$^3$, and their average particle size may be between 0.5 and 1000 µm.

The polyolefines E) which are preferred according to the invention are tetrafluoroethylene polymers with average particle diameters of 0.05 to 20 µm, preferably 0.08 to 10 µm, and a density of 1.2 to 1.9 g/cm$^3$. They are preferably used in the form of a coagulated mixture of emulsions of tetrafluoroethylene polymers E) with emulsions of graft polymers B).

Tetrafluoroethylene polymers with average particle diameters of 100 to 1000 µm and densities of 2.0 g/cm$^3$ to 2.3 g/cm$^3$ are suitable fluorinated polyolefines E) which can be used in powder form.

To prepare a coagulated mixture of B) and E), an aqueous emulsion (latex) of a graft polymer B) is first mixed with a finely dispersed emulsion of a tetraethylene polymer E); suitable tetrafluoroethylene polymer emulsions usually have solids contents of 30 to 70% by weight, particularly 50 to 60% by weight, preferably 30 to 35% by weight.

The quantitative data in the description of component B may include the proportion of graft polymer for the coagulated mixture of graft polymer and fluorinated polyolefines.

In the emulsion mixture, the equilibrium ratio of graft polymer B to tetrafluoroethylene polymer E is 95:5 to 60:40. The emulsion mixture is subsequently coagulated in the known manner, for example by spray-drying, freeze-drying, or by coagulation by means of adding inorganic or organic salts, acids or bases, or organic solvents which are miscible with water, such as alcohols or ketones, preferably at temperatures of 20 to 150° C. particularly 50 to 100° C. If necessary, it can be dried at 50 to 200° C., preferably 70 to 100° C.

Suitable tetrafluoroethylene polymer emulsions are commercially available products, and are sold by the DuPont company as Teflon® 30 N.

The moulding compositions according to the invention may contain at least one of the customary additives, such as internal lubricants and demoulding agents, nucleating agents, anti-static agents and stabilisers, as well as colorants and pigments.

In addition, the moulding compositions according to the invention may also contain very finely divided inorganic powders in an amount of up to 50 parts by weight, preferably up to 20 parts by weight and particularly from 0.5 to 10 parts by weight.

These very finely divided inorganic compounds consist of one or more metals from main groups 1 to 5 or from subgroups 1 to 8 of the periodic table of the elements, preferably from main groups 2 to 5 and from subgroups 4 to 8, most preferably from main groups 3 to 5 and subgroups 4 to 8, in combination with at least one element selected from the group comprising oxygen, sulphur, boron, phosphorus, carbon, nitrogen, hydrogen and silicon.

Examples of preferred compounds include oxides, hydroxides, hydrated oxides, sulphates, sulphites, sulphides, carbonates, carbides, nitrates, nitrites, nitrides, borates, silicates, phosphates, hydrides, phosphites or phosphonates.

Particular examples of preferred, very finely divided inorganic compounds include TiN, $TiO_2$, $SnO_2$, WC, ZnO, $Al_2O_3$, AlO(OH), $ZrO_2$, $Sb_2O_3$, $SiO_2$, iron oxides, $Na_2SO_4$, $BaSO_4$, vanadium oxides, zinc borate, silicates such as Al silicates, Mg silicates, and one-two- or three-dimensional silicates. Mixtures and doped compounds can also be used. Moreover, the surfaces of these nano-scale particles can be modified with organic molecules in order to improve the compatibility thereof with polymers. Hydrophobic or hydrophilic surfaces can be produced in this manner.

The average particle diameters are less than or equal to 200 nm, preferably less than or equal to 150 nm, particularly 1 to 100 nm.

The expressions "particle size" and "particle diameter" always denote the average particle diameter $d_{50}$ as determined by ultracentrifuge measurements as described by W. Scholtan et al., Kolloid-Z. und Z. Polymere 250 (1972), pages 782 to 796.

The inorganic compounds may exist as powders, pastes, sols, dispersions or suspensions. Powders can be obtained by precipitation from dispersions, sols or suspensions.

The powders can be incorporated in the synthetic thermoplastic materials by customary methods, for example by the direct kneading or extrusion of the constituents of the moulding composition and the very finely divided inorganic powders. The preferred methods are the preparation of a master batch, e.g. comprising flame retardant additives, other additives, monomers and solvents in component A, or co-precipitation from dispersions of the graft rubbers together with dispersions, suspensions, pastes or sols of the very finely divided inorganic materials.

The moulding compositions according to the invention may contain up to 35% by weight, with respect to the total moulding composition, of a further flame retardant which optionally has a synergistic effect. Examples of further flame retardants include organic halogen compounds such as decabromobisphenyl ether, tetrabromobisphenol, inorganic halogen compounds such as ammonium bromide, nitrogen compounds such as melamine, melamine-formaldehyde resins, inorganic hydroxide compounds such as Mg or Al hydroxide, inorganic compounds such as antimony oxide, barium metaborate, hydroxoantimonate, zirconium oxide, zirconium hydroxide, molybdenum oxide, ammonium molybdate, zinc borate, ammonium borate, barium metaborate and tin oxide, as well as siloxane compounds.

The moulding compositions according to the invention, which contain components A) to E) and optionally other known additives such as stabilisers, colorants, pigments, internal lubricants, demoulding agents and nucleating agents, as well as anti-static agents, are produced by mixing the respective constituents in the known manner, and by compounding and extruding them in the melt, at temperatures of 200° C. to 300° C., in customary processing units such as internal kneaders, extruders and twin-shaft endless screw devices, wherein component E) is preferably used in the form of the aforementioned coagulated mixture.

Mixing of the individual constituents can be effected either successively or simultaneously, in the known manner, and either at about 20° C. (room temperature) or at elevated temperature.

Due to their excellent flame-resistance, their very good processing properties and their very good mechanical properties, particularly their outstanding rigidity, the thermoplastic moulding compositions according to the invention are suitable for the production of mouldings of any type, particularly those which are subject to the requirement of increased fracture-resistance.

The moulding compositions of the present invention can be used for the production of mouldings of any type. Mouldings can be produced by injection moulding in particular. Examples of mouldings which can be produced include housing parts of any type, e.g. for domestic appliances such as juice presses, coffee machines or mixers, or for office machines, covering panels for the building sector and parts for the motor vehicle sector. These mouldings can also be used in the field of electrical engineering, because they have very good electrical properties.

Another form of processing is the production of mouldings by the swaging of previously produced panels or sheets.

Therefore, the present invention further relates to the use of the moulding compositions according to the invention for the production of mouldings of any type, preferably of the type mentioned above, and also relates to mouldings from the moulding compositions according to the invention.

EXAMPLES

Component A

A linear polycarbonate based on bisphenol A, with a relative solution viscosity of 1.252, as measured in $CH_2Cl_2$ as the solvent at 25° C. and at a concentration of 0.5 g/100 ml.

Component B

A graft polymer of 45 parts by weight of a copolymer of styrene and acrylonitrile in a ratio of 72:28 on 55 parts by weight of particulate, crosslinked polybutadiene rubber (average particle diameter $d_{50}$ 0.28 µm), produced by emulsion polymerisation.

Component C

A styrene/acrylonitrile copolymer with a ratio by weight of styrene/acrylonitrile of 72.28 and a limiting viscosity 0.55 dl/g (as measured in dimethylformamide at 20° C.).

Component D.1

A mixture of m-phenylene-bis(di-phenyl-phosphate) (Fyrolflex RDP supplied by Akzo) and triphenyl phosphate (TPP) in a ratio by weight of 3:1.

Component D.2

Triphenyl phosphate (TPP) as a comparison.

Component E

A tetrafluoroethylene polymer as a coagulated mixture of an SAN graft polymer emulsion according to the aforementioned component B in water and a tetrafluoroethylene polymer emulsion in water. The ratio by weight of graft polymer B to tetrafluoroethylene polymer E in the mixture was 90% by weight to 10% by weight. The tetrafluoroethylene polymer emulsion had a solids content of 60% by weight, and its average particle diameter was between 0.05 and 0.5 µm. The SAN graft polymer emulsion had a solids content of 34% by weight and an average latex particle diameter of $d_{50}$=0.28 µm.

Production of E

The emulsion of the tetrafluoroethylene polymer (Teflon 30 N supplied by DuPont) was mixed with the emulsion of SAN graft polymer B and was stabilised with 1.8% by weight, with respect to the polymer solids, of phenolic anti-oxidants. The mixture was coagulated at 85 to 95° C. with an aqueous solution of $MgSO_4$ (Epsom salts) and acetic acid at pH 4 to 5, was filtered and washed until practically free from electrolyte, was subsequently freed from the bulk of the water by centrifuging, and thereafter was dried at 100°0 C. to form a powder. This powder could then be compounded with the other components in the processing units described above.

Production and Testing of Moulding Compositions According to the Invention

The components were mixed in a 3-liter internal kneader. Mouldings were produced in an Arburg Type 270 E injection moulding machine at 260° C.

The Vicat B thermal deformation resistance was determined according to DIN 53 460 (ISO 306) on bars of dimensions 80×10×4 mm³.

The tensile modulus of elasticity was determined according to DIN 53 457/ISO 527.

The yield stress was determined according to ISO 527.

The ultimate tensile strength (tensile test) was determined according to ISO 527/DIN 53455.

TABLE 1

Composition and properties of polycarbonate-ABS moulding compositions

| Example | 1 (comparative) | 2 |
|---|---|---|
| Components [parts by weight] | | |
| A | 83.8 | 83.8 |
| B | 4.3 | 4.3 |
| C | 2.7 | 2.7 |
| D.1 | — | 6.8 |
| D.2 | 6.8 | — |
| E | 2.4 | 2.4 |
| Properties: | | |
| Vicat B [° C.] | 107 | 110 |
| Ultimate tensile strength [N/mm²] | 47.2 | 49.7 |
| Yield stress [N/mm²] | 58.0 | 61.1 |
| Tensile modulus of elasticity [N/mm²] | 2628 | 2651 |

What is claimed is:

1. Thermoplastic, flame-retardent moulding compositions, containing
   A. 40 to 99 parts by weight of a thermoplastic polycarbonate of polyester carbonate,
   B. 0.5 to 60 parts by weight of a graft polymer of
   B.1 5 to 95% by weight of one or more vinyl monomers on B.2 95 to 5 by weight of one or more graft bases with glass transition temperature <0° C. and average particle size ($d_{50}$ value) of 0.20 to 0.35 μm.

C. 0 to 45 parts by weight of a thermoplastic vinyl copolymer

D. 0.5 to 20 parts by weight of a mixture of at least one mono- and at least one oligo-phosphorus compound of general formula (I)

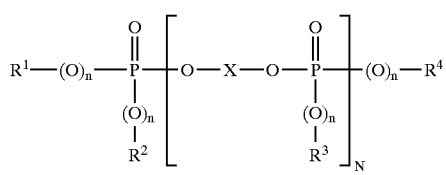

wherein $R^1$, $R^2$, $R^3$ and $R^4$, independently of each other, each denote a $C_1$ to $C_8$ alkyl which is optionally halogenated, a $C_5$ to $C_6$ cycloalkyl, $C_6$ to $C_{20}$ aryl or $C_7$ to $C_{20}$ aralkyl, which are each optionally substituted by an alkyl, and/or by a halogen, n denotes 0 or 1, which are independent of each other, N denotes 0 to 30, and X denotes a mono- or polynuclear aromatic radical containing 6 to 30 C atoms, and E denotes 0.05 to 5 parts by weight of a fluorinated polyolefine.

2. Moulding compositions according to claim 1 which contain 40 parts by weight of component B and 0 to 30 parts by weight of component C.

3. Moulding compositions according to claim 1, wherein the average particle size $d_{50}$ of component B is 0.25 to 0.30 μm.

4. Moulding compositions according to claim 1, wherein the ratio by weight of components B:C is between 2:1 and 1:4.

5. Moulding compositions according to claim 1 which contain 10 to 90% by weight of at least one monophosphate compound of formula (I) and 90 to 10% by weight (with respect to the total amount of phosphorus compounds in each case) of at least one oligophosphorus compound of formula (I).

6. Moulding compositions according to claim 1, wherein N in formula (I) has an average value of 0.3 to 2.0.

7. Moulding compositions according to claim 1 which contain tip to 35% by weight, with respect to the total moulding composition, of at least one flame retardant which is different from component D.

8. Moulding compositions according to claim 1, which contain 1 to 18 parts by weight of component D.

9. Moulding compositions according to claim 1, wherein graft base B.2 is a diene rubber, an acrylate rubber, a silicone rubber or an ethylene-propylene diene rubber.

10. Mouldings produced from moulding compositions according to claim 1.

11. The molding composition according to claim 1 wherein monophosphorus compound of formula (I) is at least one member selected from the group consisting of tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl-2-ethyl-cresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide and tricresylphosphine oxide.

12. The molding composition according to claim 1 further containing a very finely divided compound having average particle diameter of less than or equal to 200 nm comprising an element from main groups 1 to 5 or from subgroups 1 to 8 of the periodic table of the elements, in combination with at least one element selected from the group consisting of oxygen, sulphur, boron, carbon, phosphorus, nitrogen, hydrogen and silicon.

13. The molding composition according to claim 1 which further contains at least one additive selected from the group consisting of stabilizers, pigments, demoulding agents, flow enhancers and anti-static agents.

14. The molding composition of claim 1 wherein said C is present in an amount of 2 to 25 part by weight.

* * * * *

UNITED STATES PATENT AND TRADEMARK OFFICE
CERTIFICATE OF CORRECTION

PATENT NO. : 6,753,366 B1 Page 1 of 1
APPLICATION NO. : 09/485288
DATED : June 22, 2004
INVENTOR(S) : Thomas Eckel et al.

It is certified that error appears in the above-identified patent and that said Letters Patent is hereby corrected as shown below:

In the specification:

Column 7, line 2, change "50%" to --50 wt.-%--.

Signed and Sealed this

Twenty-ninth Day of April, 2008

JON W. DUDAS
*Director of the United States Patent and Trademark Office*